(12) United States Patent
Shrestha et al.

(10) Patent No.: US 11,740,407 B2
(45) Date of Patent: Aug. 29, 2023

(54) ETCHED FACET COUPLING FOR FLIP-CHIP TO PHOTONICS CHIP BONDING

(71) Applicant: Voyant Photonics, Inc., New York, NY (US)

(72) Inventors: Sajan Shrestha, New York, NY (US); William Sean Ring, New York, NY (US)

(73) Assignee: Voyant Photonics, Inc., New York, NY (US)

( * ) Notice: Subject to any disclaimer, the term of this patent is extended or adjusted under 35 U.S.C. 154(b) by 0 days.

(21) Appl. No.: 17/508,531

(22) Filed: Oct. 22, 2021

(65) Prior Publication Data

US 2023/0130139 A1 Apr. 27, 2023

(51) Int. Cl.
*G02B 6/12* (2006.01)
*G02B 6/122* (2006.01)

(52) U.S. Cl.
CPC .......... *G02B 6/122* (2013.01); *G02B 6/12004* (2013.01)

(58) Field of Classification Search
CPC ........................................ G02B 6/12
See application file for complete search history.

(56) References Cited

U.S. PATENT DOCUMENTS

| | | | | |
|---|---|---|---|---|
| 10,895,682 | B1 * | 1/2021 | Barwicz | H05K 7/20163 |
| 2002/0150320 | A1 * | 10/2002 | Kato | H01S 5/10 |
| | | | | 385/33 |
| 2009/0324173 | A1 * | 12/2009 | Asghari | G02B 6/42 |
| | | | | 385/52 |
| 2010/0008622 | A1 * | 1/2010 | Watanabe | G02B 6/12004 |
| | | | | 385/14 |
| 2014/0133864 | A1 * | 5/2014 | Asghari | G02B 6/423 |
| | | | | 398/141 |
| 2014/0348461 | A1 * | 11/2014 | Budd | G02B 6/125 |
| | | | | 156/60 |
| 2015/0277044 | A1 * | 10/2015 | Hatori | G02B 6/1228 |
| | | | | 438/31 |
| 2016/0291265 | A1 * | 10/2016 | Kinghorn | G02B 6/4238 |
| 2018/0081207 | A1 * | 3/2018 | Qian | G02B 6/30 |
| 2018/0180826 | A1 * | 6/2018 | Merget | G02B 6/136 |

FOREIGN PATENT DOCUMENTS

JP 6-230237 A * 8/1994

OTHER PUBLICATIONS

F. E. Doany et al., "A four-channel silicon photonic carrier with flipchip integrated semiconductor optical amplifier (SOA) array providing >10-dB gain," in Proc. 66th Int. Conf. Electron. Compon. Technol., 2016, pp. 1061-1068.

D. Carrara et al., "Hybrid III-V/silicon photonic integrated circuits for high bitrates telecommunication applications," Proc. SPIE, Integr. Opt. Devices Mater. Technol. XXI, vol. 10106, 2017, Art. No. 101060G.

(Continued)

*Primary Examiner* — Michael Stahl
(74) *Attorney, Agent, or Firm* — Stratford Group Ltd.

(57) ABSTRACT

Disclosed are integrated photonics systems including a coupling strategy to couple light in and out of optoelectronic flip-chips bonded to a photonics chip. The refined tolerances for flip-chip assembly and angled facets defined on both chips at optical couplings improve optical performance.

20 Claims, 8 Drawing Sheets

(56) References Cited

OTHER PUBLICATIONS

R. A. Budd et al., "Semiconductor optical amplifier (SOA) packaging for scalable and gain-integrated silicon photonic switching platforms," 2015 IEEE 65th Electronic Components and Technology Conference (ECTC), 2015, pp. 1280-1286, doi: 10.1109/ECTC.2015.7159762.
T. Matsumoto et al., "Hybrid-Integration of SOA on Silicon Photonics Platform Based on Flip-Chip Bonding," in Journal of Lightwave Technology, vol. 37, No. 2, pp. 307-313, Jan. 15, 15, 2019, doi: 10.1109/JLT.2018.2870128.
International Search Report issued for corresponding International Application No. PCT/US2022/078525 dated Dec. 16, 2022.
Written Opinion of the International Searching Authority issued for corresponding International Application No. PCT/US2022/078525 dated Dec. 16, 2022.
L. Schares et al., "Etched-facet semiconductor optical amplifiers for gain-integrated photonic switch fabrics," 2015 European Conference on Optical Communication (ECOC), 2015, pp. 1-3, doi: 10.1109/ECOC.2015.7341614.

\* cited by examiner

ETCHED FACET COUPLING FOR FLIP-CHIP TO PHOTONICS CHIP BONDING

FIELD OF THE INVENTION

The present disclosure relates to photonics systems and particularly to integrated photonics systems including bonding arrangements and the optical coupling of optoelectronic flip-chips with host photonics chips.

BRIEF SUMMARY

According to a first aspect, there is provided an integrated photonics system including: a photonics chip including a substrate, first one or more waveguides, and at least one pedestal formed in a trench of the photonics chip on the substrate; and an optoelectronic flip-chip including second one or more waveguides, the optoelectronic flip-chip situated within the trench and flip-chip bonded to the photonics chip; in which the first one or more waveguides are arranged to optically couple, across gaps between the photonics chip and the optoelectronic flip-chip, to respective second one or more waveguides defining optical couplings, and in which within each optical coupling an angled facet of the photonics chip is angled away from a first plane generally defining a side of the photonics chip adjacent the gap.

In some embodiments, the angled facets of the photonics chip comprise lithographically defined etched angled facets.

In some embodiments, the angled facets of the photonics chip are angled such that phase tilt due to angular emission to and from the optoelectronic flip-chip is reduced.

In some embodiments, the angled facets of the photonics chip are angled at substantially 15°-25° with respect to the first plane.

In some embodiments, sides of the optoelectronic flip-chip adjacent the gaps have been formed lithographically and not been cleaved.

In some embodiments, within each optical coupling an angled facet of the optoelectronic flip-chip is angled away from the first plane.

In some embodiments, the angled facets of the optoelectronic flip-chip comprise lithographically defined etched angled facets.

In some embodiments, the angled facets of the optoelectronic flip-chip are angled away from a second plane perpendicular to the second one or more waveguides such that back-reflection within the optoelectronic flip-chip is reduced.

In some embodiments, the angled facets of the optoelectronic flip-chip are angled at substantially 4°-10° with respect to the second plane.

In some embodiments, the respective second one or more waveguides are substantially perpendicular to the first plane.

In some embodiments, the first one or more waveguides comprise pairs of waveguides situated on opposite sides of the optoelectronic flip-chip and aligned with one another across the optoelectronic flip-chip.

In some embodiments, the first one or more waveguides are angled at substantially 1°-7° with respect to the respective second one or more waveguides, within each optical coupling an angled facet of the optoelectronic flip-chip is angled at substantially 4°-10° with respect to the first plane, and the angled facets of the photonics chip are angled at substantially 15°-25° with respect to the first plane.

In some embodiments, the photonics chip comprises at least one pedestal within the trench on which the optoelectronic flip-chip rests.

In some embodiments, the at least one pedestal comprises selectively etched pedestal Z-stops.

In some embodiments, the optoelectronic flip-chip comprises selectively etched complementary Z-stops where the optoelectronic flip-chip rests on said at least one pedestal.

In some embodiments, said pedestal Z-stops and said complementary Z-stops are etched such that said first one or more waveguides and said respective second one or more waveguides are aligned in a Z direction.

In some embodiments, the optoelectronic flip-chip and the photonics chip each have alignment marks for lateral alignment during the flip-chip bonding process.

In some embodiments, the angled facets of the photonics chip comprise lithographically defined etched angled facets, each of which comprises a freeform curved surface.

In some embodiments, the photonics chip comprises a silicon photonics (SiP) chip, and the optoelectronic flip-chip comprises an indium phosphide (InP) based Semiconductor Optical Amplifier (SOA).

In some embodiments, the first one or more waveguides are tapered to substantially 400 nm, the second one or more waveguides are tapered to substantially 200 nm, a width of the gap is substantially 500 nm, the respective second one or more waveguides are substantially perpendicular to the first plane, the first one or more waveguides are angled at substantially 4° with respect to the respective second one or more waveguides, within each optical coupling an angled facet of the optoelectronic flip-chip is angled at substantially 7° with respect to the first plane, and the angled facets of the photonics chip are angled at substantially 20° with respect to the first plane The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

Figure 1A:
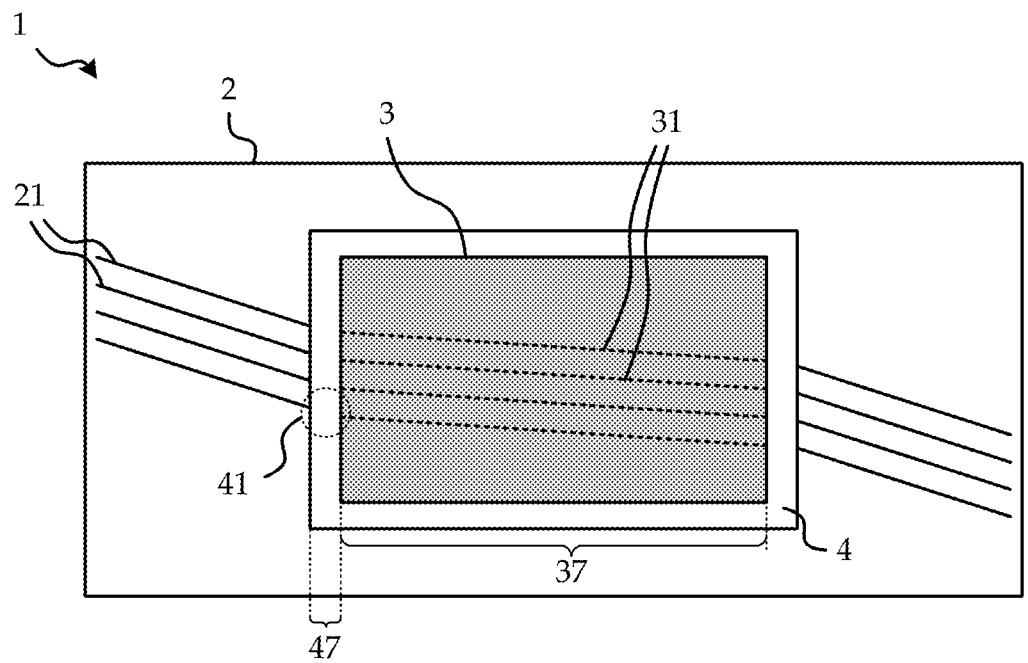
FIG. 1A is a schematic block diagram of an integrated photonics system with known bonding arrangement of a optoelectronic flip-chip with a host photonics chip.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the scope of an invention as defined by the appended claims.

DETAILED DESCRIPTION

Indium Phosphide based Semiconductor Optical Amplifiers (InP-SOA) are commonly used for on-chip optical amplification in silicon photonics systems to overcome link budget losses due to propagation through various components such as phase shifters, splitters, mode converters, etc. Optical gain is also desirable to boost signal strength for long range LIDAR applications. Direct wafer-bonding of InP-SOA on silicon photonics (SiP) chip followed by direct lithography of gain sections provides better alignment and coupling efficiencies at the input and output sections of the SOA and SiP chip interface. However, use of III-V semiconductor in most CMOS foundries is forbidden. Hence, flip-chip bonding InP-SOA onto SiP chips is the primary integration method used in commercial applications. An alignment accuracy of less than ±1 can be achieved with current flip-chip bonding technology for the placement of InP-SOAs on the SiP chips. Generally speaking, flip-chip bonding arrangements can be utilized for integration of any kind of semiconductor component within a photonics chip.

Figure 1B:
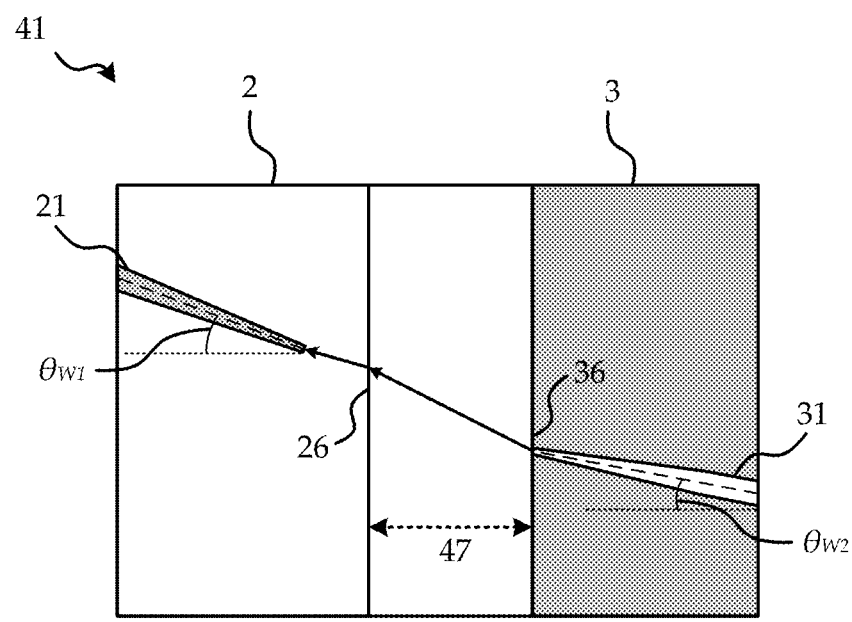
FIG. 1B is a schematic block diagram of a known optical coupling of the optoelectronic flip-chip and host photonics chip of FIG. 1A.

With reference to FIGS. 1A and 1B known bonding arrangements and optical couplings 41 of an integrated photonics system 1 with a dual sided, multichannel, angled waveguide SOA flip-chip 3 and a host SiP chip 2 will now be discussed.

An SOA flip-chip 3 is flip-chip bonded within a trench 4 of a host SiP chip 2, such that ingress and egress optical signals traversing SiP waveguides 21 of the SiP chip 2 are coupled into and out of SOA waveguides 31 of the SOA 3 at optical couplings 41 defined by the facets 36 of the SOA 3 and facets 26 of the SiP chip 2 into and out of which optical signals traversing the waveguides 21 31 pass.

Assuming optimal alignment of both the input and output waveguides 31 of the SOA 3 with the waveguides 21 on the SiP chip 2, maximum optical coupling is attained when the optical mode sizes of the SOA and SiP waveguides 31 21 are identical. To achieve this, waveguides 31 21 on both SOAs 3 and SiP chips 2 are engineered with spot size converters to match their mode sizes. Tapering the waveguide width is one of the methods for spot size conversion.

Given common optical mode sizes of SOA and SiP chip waveguides 31 21, the facet 36 of the SOA 3 and the facet 26 of the SiP chip 2 should also be in proximity with each other to avoid optical losses due to diffractive mode expansion in freespace. The optical gap 47 between the SOA 3 and the SiP chip 2 is generally between 0.5 to 2 µm for ideal coupling. In addition to this, for proper operation of an SOA 3, back-reflection at the facets 36 of the SOAs should be reduced or eliminated to reduce gain ripples. To reduce such back-reflections, waveguides 31 in the SOA 3 are often angled at both input and output facets 36. Anti-reflection (AR) coatings are also applied to facets 36 of the SOAs 3 to further reduce reflection. The angled waveguides 31 on the SOAs 3 require angled waveguides 21 on the SiP chip 2 as well. Unfortunately, the modes emitted by these angled waveguides 21 31 are distorted due to the tilted phase front due to the angular emission. The distortion is proportional to the angle and results in reduction in optical coupling compared to head on coupling.

It should be noted, that the angled waveguides 31 on the SOA 3 require the output waveguides 21 of the SiP chip 2 (e.g. shown on the left-hand side of FIG. 1A), to be laterally offset relative to the input waveguides 21 of the SiP chip 2 (e.g. shown on the right hand-side of FIG. 1A). As can be seen in FIG. 1B, a close up of the coupling region 41, a tapered SOA waveguide 31 is angled at the facet with an angle of $\theta_{W2}$ from a line perpendicular to a side 36 of the SOA 3 running along the length of the gap 47 between the SOA 3 and the SiP chip 2, and a corresponding SiN waveguide 21 coupler, also tapered to match the mode of the SOA waveguide 31, is angled with angle of $\theta_{W1}$ from the line perpendicular to the facet 26 of the SiP chip 2.

SOAs 3 are commonly cleaved out of the InP epitaxial wafers after definition of the device using various lithographic steps. The cleaving process adds an uncertainty of up to ±4 µm on the design length 37 of the SOA 3 gain section. This cleaving tolerance requires a wider SOA trench 4 on the SiP chip 2 to ensure the SOAs 3 can be inserted into the trench 4 using the flip-chip process. This can result in a large SOA-to-SiP facet distance or gap 47 of up to 10 µm in the worst case for dual sided SOAs 3, due to tolerance stackup. At such large distances, the SOA 3 (or SiP chip 2) waveguide modes will spatially expand to an extent which cannot be collected efficiently by the complementary coupler on the SiP chip 2 (or SOA 3) side. The variation in the length 37 of the SOA will also result in undesirable lateral alignment for dual-sided SOAs 3 when angled waveguides 31 are used since only one side can be properly aligned. The overall effect is a significantly reduced coupling efficiency.

Figure 2A:
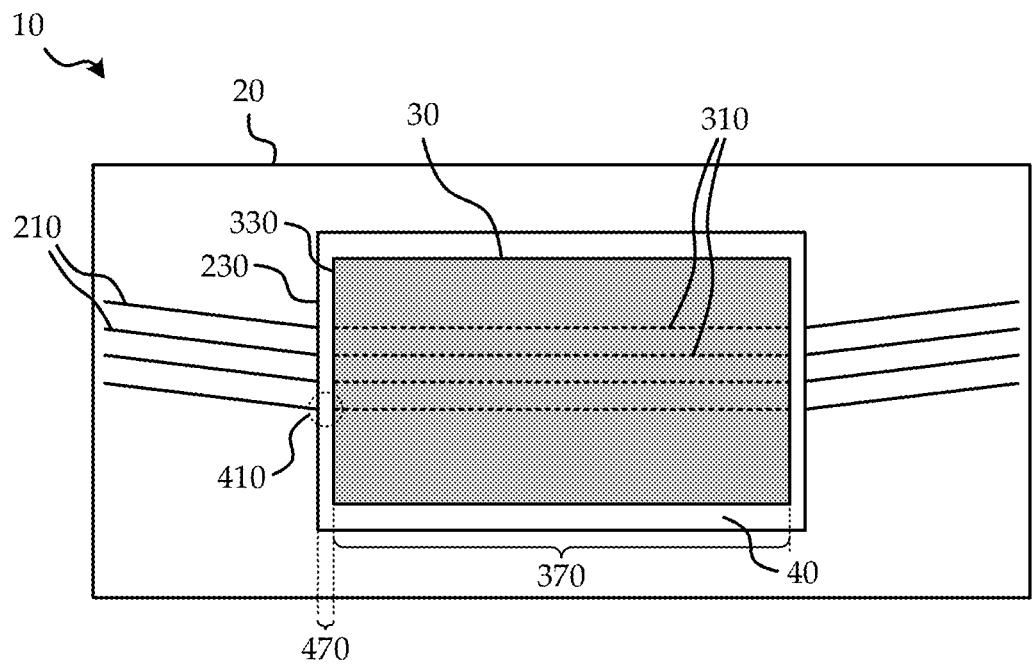
FIG. 2A is a schematic block diagram of an integrated photonics system with a bonding arrangement of an optoelectronic flip-chip with a host photonics chip according to an embodiment.
Figure 2B:
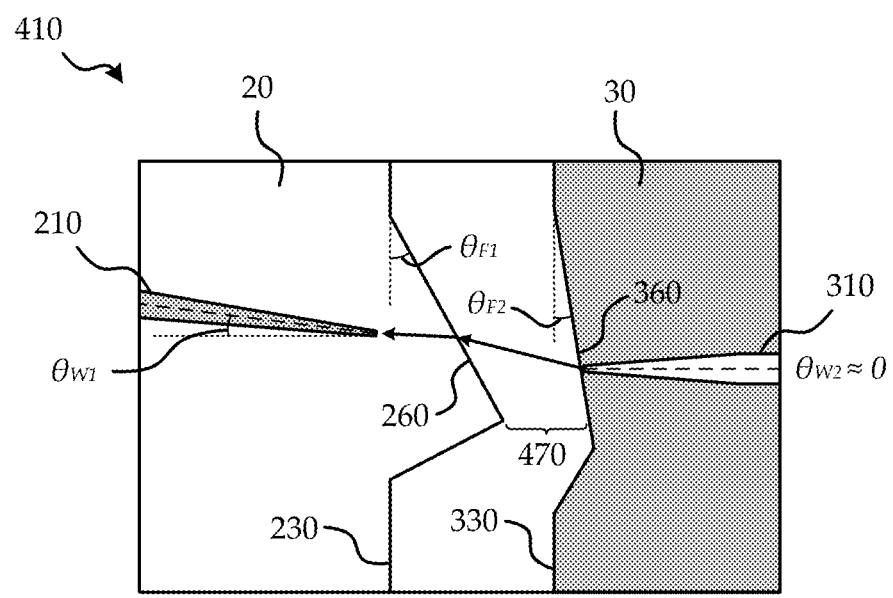
FIG. 2B is a schematic block diagram of an optical coupling of the optoelectronic flip-chip and host photonics chip of FIG. 2A.

With reference to FIGS. 2A and 2B, improved bonding arrangements and optical couplings 410 of an integrated photonics system 10 with an optoelectronic flip-chip 30 and a host photonics chip 20, will now be discussed. Although in the example illustrated in FIGS. 2A and 2B, the optoelectronic flip-chip 30 is a dual sided multi-channel semiconductor gain flip-chip or SOA flip-chip, while the host photonics chip 20 is an SiP chip, skilled persons in the art will understand that other optoelectronic flip-chips, such as single sided reflective semiconductor optical amplifiers (RSOAs) or diode lasers, and host photonics chips may be comprised in an integrated photonics system 10 according to the embodiments depicted and described herein.

The integrated photonics system 10 has a bonding arrangement which demonstrates improved coupling efficiency at both the input and output facets of the SOA-SiP interface and relaxes the alignment tolerance of the flip-chip bonding process for better performance of multi-channel SOAs 30. The improved integrated photonics system 10 includes an SOA 30 with lithographically defined etched facets to reduce back-reflections, which provides more accurate control the SOA length section 370 allowing for a tighter integration with the SiP chip 20. Further lithographic defining of etched facets on the SiP chip 20, and improved vertical and lateral alignment as described below, lead to overall improvement of coupling efficiency with the flip-chip integration process, which is crucial for improving dual pass multichannel SOA performance when integrated with SiPs that require large on-chip gain.

In the improved integrated photonics system 10, both the SOA 30 and the SiP chip 20 have lithographically defined etched angled facets 360 260 at optical coupling regions 410. Due to the input and output facets 360 of the SOA 30 being defined lithographically, the length 370 of the gain section on the SOA 30, and effectively the entire length of the SOA 30, is more precisely defined than the processes relying on cleaving. This means the SiP chip-SOA trench 40 does not need to be widened to accommodate for variation of SOA 30 lengths which result from cleaving. In addition, since the facets 360 of the SOA 30 are lithographically defined, they can be etched at an angle allowing for the SOA waveguides 310 to be straight, (i.e. along a line perpendicular to a side 330 of the SOA 30 running along the length of the gap 470 between the SOA 30 and the SiP chip 20) while still reducing the back-reflection of light into the SOA waveguides 310 due to the angle between the facets 360 and a plane perpendicular to the straight SOA waveguides 310. The angled facet 360 also results in emission of the waveguide mode with tilted phase front, but complementary angled etched facets 260 are defined on the SiP chip 20, which reduces the phase tilt such that the tapered waveguides 210 on the SiP chip 20 can be made with minimal angular tilt, improving the optical coupling efficiency.

It should be noted that since the waveguides 310 of the SOA 30 are straight ($\theta_{W2} \approx 0°$), the complementary waveguides 210 on the SiP chip 20 (shown on the left and right hand sides in FIG. 2A) symmetrically opposite from each other with no lateral offset. In addition, due to the precise control of the length of the SOA 30 in a direction of the waveguides 310, the SOA trench 40 can be designed to fit the SOA 30 with a better fit and a smaller gap 470 compared to known arrangements as shown in FIGS. 1A, 1B.

A close-up of a single optical coupling region 410 illustrated in FIG. 2B, shows the angled facet 360 on the SOA 30, in relation to the angled facet 260 on the SiP chip 20. The facet 360 on the SOA 30 is angled ($\theta_{F2}$) away from a plane parallel to side 330 of the SOA 30 to reduce back-reflection while the facet 260 on the SiP chip 20 is angled ($\theta_{F1}$) away from a plane parallel to side 230 of the SiP chip 20 to correct phase tilt due to the angular emission to and from the SOA chip 30. It is to be understood that corresponding optical couplings 410 are arranged at the gap on the other side of the SOA chip 30 and are configured in mirror symmetry to that shown explicitly in FIG. 2B.

Although the integrated photonics system 10 has been described above as specifically including a semiconductor optical amplifier, it should be understood that the integrated photonics system 10 exhibiting the improved arrangement and couplings of FIGS. 2A, 2B, and as illustrated and described below in connection with FIGS. 3, 4, and 5, includes any type of optoelectronic flip-chip in an arrangement in which back-reflection from the coupling facets of the optoelectronic flip-chip is undesirable and in which correction of the phase tilt due to angular emission to and from the optoelectronic flip-chip is preferable. Although the angles ($\theta_{F1}$) ($\theta_{F2}$) of the facets 260 360 have been shown so as to define facets which coincide with planes which have a particular rotational orientation about a normal to their respective generally planar sides 230 330, it should be understood that the facets may be oriented at those angles in any rotational orientation about those normals as long as the orientations of the angles of opposing facets 360 260 are appropriately matched.

Figure 3:
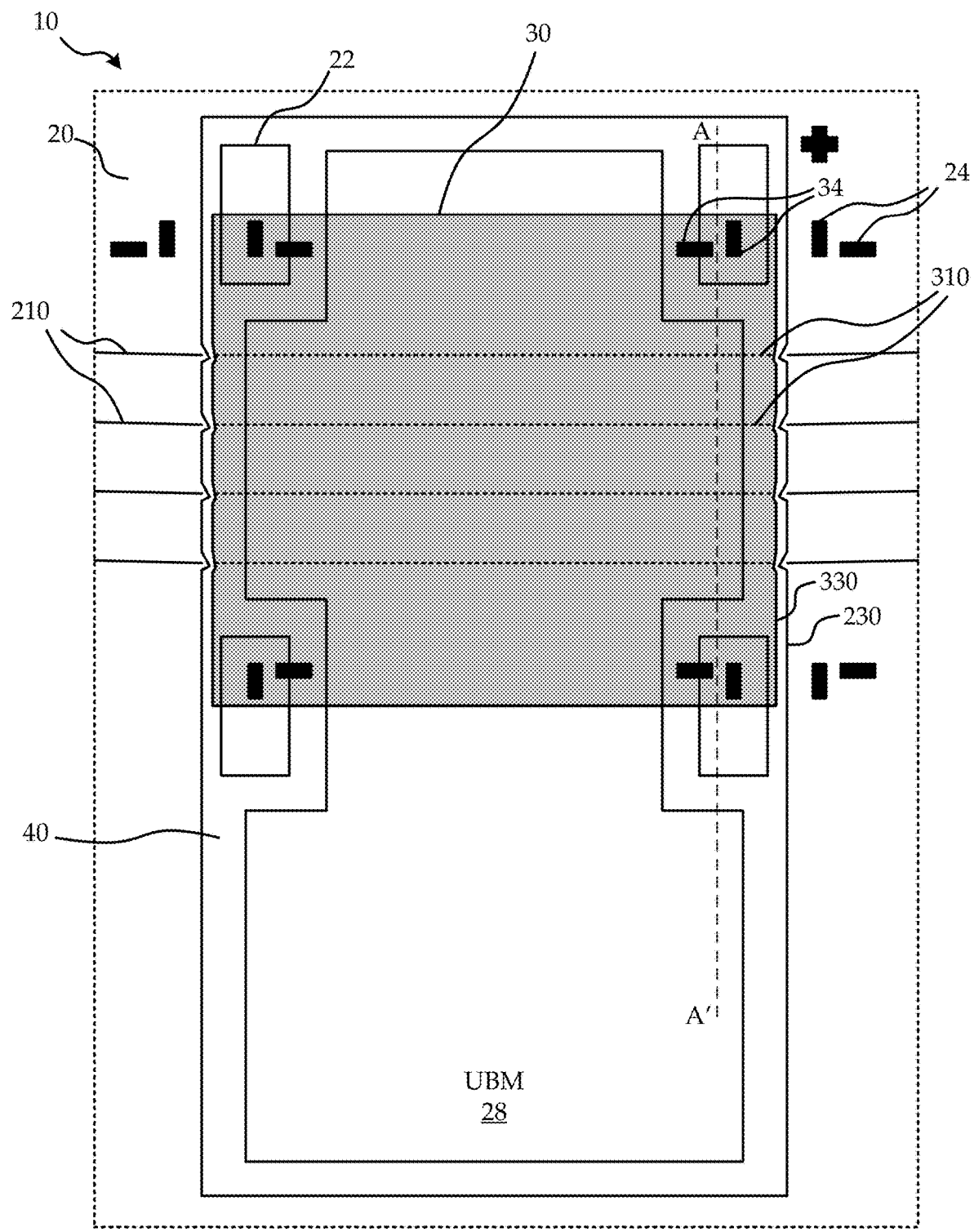
FIG. 3 is a detailed plan view of an integrated photonics system including an optoelectronic flip-chip and a host photonics chip according to an embodiment.
Figure 4:
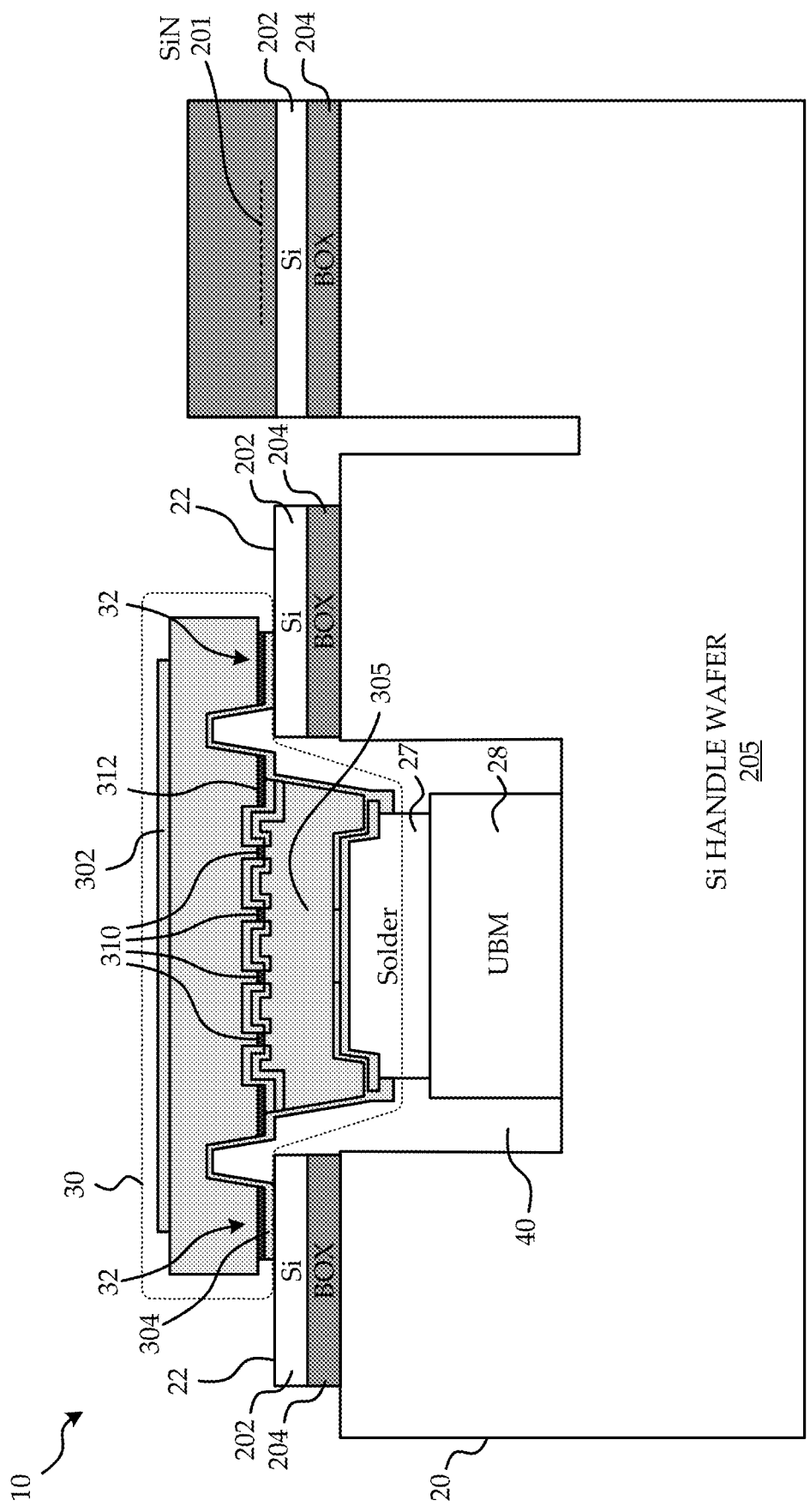
FIG. 4 is a cross-sectional view (along A-A' of FIG. 3) of the integrated photonics system of FIG. 3.
Figure 5:
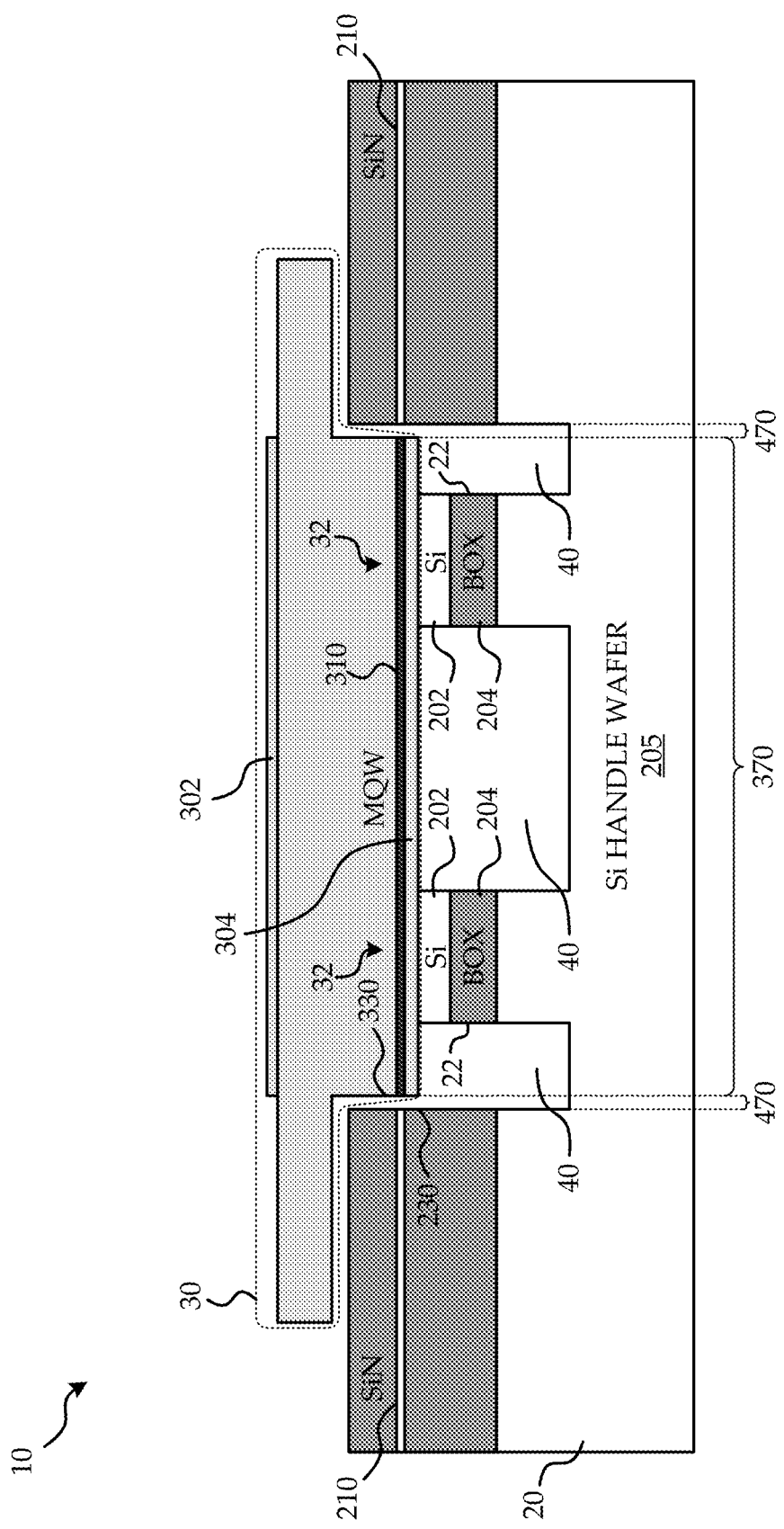
FIG. 5 is a lateral schematic view of the integrated photonics system of FIGS. 3 and 4.

Referring now also to FIGS. 3, 4, and 5, a detailed plan, cross-sectional, and lateral view, respectively, of an integrated photonics system 10 including an optoelectronic flip-chip 30 and a host photonics chip 20 according to an embodiment, will now be discussed.

The improved integrated photonics system 10 is an SiP-SOA hybrid integration platform including a SiP chip 20 with a 220 nm thick SOI (Silicon on Insulator) layer 202 and 3 μm thick buried oxide (BOX) layer 204. In addition to the epitaxial silicon, a low pressure chemical vapor deposition (LPCVD) grown silicon nitride (SiN) of 400 nm thickness is also present above the silicon layer separated by a thin plasma enhanced chemical vapor deposition (PECVD) grown oxide (not shown). The SOA 30 has a buried heterostructure type Multiple Quantum Well (MQW) gain section with Indium Phosphide (InP) blocking layer. Of the MQW material layer 312 specific gain sections comprising the MQW waveguides 310 themselves span the width of the SOA 30 as shown in FIGS. 3 and 4. The dual sided SOA 30 sits inside a trench 40 defined on the SiP chip 20 such that the SOA waveguides 310 are aligned to couple to the Silicon Nitride (SiN) waveguides 210 on the SiP chip 20 as shown in FIGS. 3 and 5.

Positioning and alignment of the SiP chip 20 is achieved by defining four Z-Stop pedestals 22 atop a Si substrate handle wafer 205 within the cavity 40 where the SOA 30 mechanically rests. The height of the Z-stop pedestals 22 is accurately defined by selective etching of oxide over cladding (not shown) on top of the epitaxial silicon layer 202 where the silicon layer 202 acts as the etch stop layer. Complementary Z-stop supports 32 are also defined on the SOA 30 using selective etching of InP over cladding 305 where the MQW active region acts as the etch stop layer, and as such, the MQW active region acts as the primary Z-stop surface on the SOA 30, however, the SOA 30 is covered with an SiN passivation layer 304 before flip-chip bonding. Although the SiN passivation layer serves to protect the SOA from the environment, it is the thickness of this SiN passivation layer 304 which is used to properly align the SOA waveguides 310 and the SiP waveguides 210 in the z-direction. The precise etch stops on both the SOA 30 and SiP chips 20 allows for a very accurate vertical alignment (alignment in the "Z" direction) between the SiN waveguide 210 on the SiP chip 20 and the MQW active waveguide 310 on the SOA 30. All sitting atop an Si substrate 205, the bottom of the SOA trench 40 includes a lithographically defined Under Bump Metal stack (UBM) 28 and solder 27 for contact with the P-side metals of the SOA 30 when it is inserted in the trench 40. Accordingly, the host photonics chip 20 includes metal traces for electrically coupling to the P-side of the optoelectronic flip-chip 30.

Referring specifically to FIG. 4, a cross-sectional view of the material stack of the SOA 30 and the SiP chip 20 after flip-chip bonding is shown, corresponding to the dotted line A-A' of FIG. 3. The level 201 of the SiN waveguide layer, depicted in FIG. 4 as a dotted line for reference only, indicates the z alignment of the SiN waveguides 210, which themselves are only visible in FIGS. 3 and 5. As clearly shown in FIG. 5, the SOA 30 mechanically rests on the Z-Stops defined on the pedestals 22 of the SiP chip 20 such that the active MQW waveguide layer 310 of the SOA 30 is aligned vertically with the SiN waveguide layer 210 in the SiP chip 20. The P-side (opposite the N-metal contact 302) of the SOA 30 is contacted with the SiP chip 20 using a lithographically defined under bump metal (UBM) stack 28 (which may comprise one or more layers of metal materials) inside the SOA trench 40 and solder 27. An N-side contact 302 is also defined on the top side of the SOA 30 for driving the SOA 30.

Referring to FIG. 5 specifically, a lateral view of the SOA-SiP chip integration 10 shows the alignment of the SiN waveguide layer 210 with the active MQW waveguide layer 310 in the SOA 30. In this figure, the light travels from left to right, or vice versa, through the SiN waveguides 210 into the SOA waveguides 310 and back into the SiN waveguides 210. As mentioned above, a thin passivation layer 304 of SiN is present on the surface of the complementary Z-stop supports 32 of the SOA 30 to assist further with alignment.

As shown in the schematics in FIG. 3, alignment marks 34 defined on the P-side and N-side of the SOA 30 are laterally aligned to complementary alignment marks 24 defined on the SiP chip 20 during the flip-chip process for improving optical coupling.

As shown in the schematics in FIG. 3, the UBM 28, shown under the SOA 30 in FIG. 4, may also extend laterally to form an exposed pad to allow electrical connection to the P-side of the SOA 30 through, for example, a wire bond connected to the exposed pad of the UBM 28.

Figure 6A:
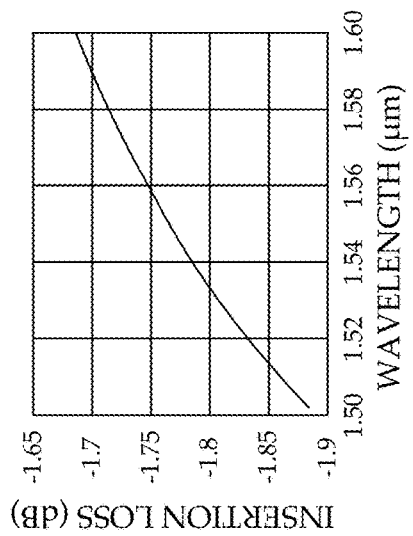
FIG. 6A illustrates back reflection of an angled etched facet according to an embodiment.

Optimal optical coupling between the SOA waveguides 310 and SiN waveguides 210 is achieved by selecting appropriate taper widths for the SOA waveguides 310 and SiN waveguides 210 to maximize mode matching and relax alignment tolerances. Furthermore, ranges of angles of the etched facet on the SOAs ($\theta_{F2}$) are numerically simulated to determine the appropriate value that minimizes back-reflection. In some embodiments, the numerical simulation used to determine the appropriate angle includes Electromagnetic Finite Difference Time Domain (FDTD) Simulation. A 7° angled ($\theta_{F2}$) etched facet of an SOA 30 with tapered waveguide width of 400 nm results in a back-reflection of −43 dB at 1550 nm as shown in FIG. 6A. It should be noted that since the waveguides 310 of the SOA 30 are straight ($\theta_{W2} \approx 0°$), the facet 360 angle ($\theta_{F2}$) also defines the angle the facet 360 makes with a plane perpendicular to the waveguides 310.

The values for the SiP chip 20 facet angle ($\theta_{F1}$) and the SiN waveguide 210 angle ($\theta_{W1}$) to optimize coupling for this given SOA 30 is determined also by numerical simulation. In some embodiments, FDTD simulations are used in which the SiN waveguide 210 angle ($\theta_{W1}$) and SiP chip 20 facet angle ($\theta_{F1}$) are swept through various values to maximize the coupling at the desired wavelength. In the example embodiment shown, given the relatively low index of refraction of the SiP chip facet in relation to the relatively high index of refraction of the SOA facet, in order to keep the angle or tilt ($\theta_{W1}$) of the SiN waveguides 210 small, a larger SiP chip 20 facet angle ($\theta_{F1}$) is utilized to redirect the light in the gap 470 which has been tilted due to the SOA 30 facet angle ($\theta_{F2}$) but without being so large as to cause undue insertion loss. In some embodiments, initial angles and taper widths are chosen based on Snell's law, and the optimization process varies the angles and taper widths to create different configurations, and the results of numerical simulations are used to determine the optimal configuration based on predetermined constraints (e.g. achievable gap size, wavelength, indices of refraction) and/or performance thresholds.

Figure 6B:
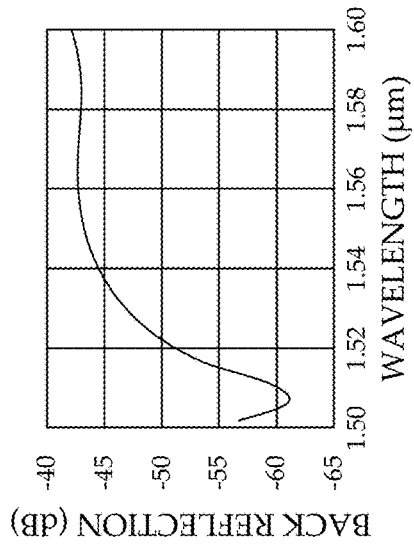
FIG. 6B illustrates insertion loss versus wavelength for an optimized coupling according to an embodiment.
Figure 6C:
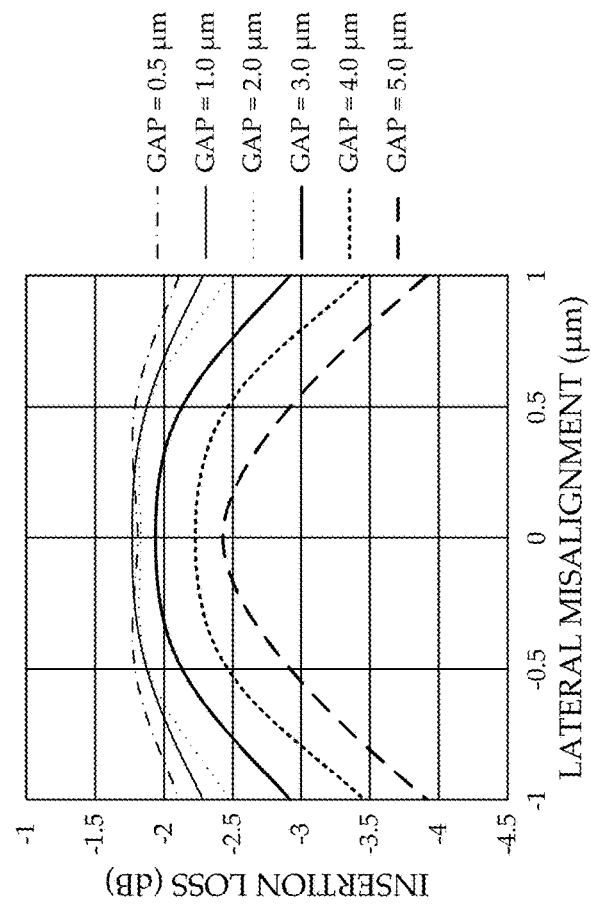
FIG. 6C illustrates insertion loss versus lateral misalignment at various gap sizes, for an optimized coupling according to an embodiment.

An optimal coupling for an example SOA-SiP integrated photonics system 10 with SOA 30 facet angles ($\theta_{F2}$) of 7° with a gap 470 of 500 nm, includes SOA waveguides 310 tapered to 400 nm and SiN waveguides 210 tapered to 200 nm with SiP chip 20 facet angle ($\theta_{F1}$) of 20°, and SiN waveguide 210 angle or tilt ($\theta_{W1}$) of 4°. It should be noted that since the waveguides 310 of the SOA 30 are straight ($\theta_{W2} 0°$), the facet 260 angle ($\theta_{F1}$) also defines the angle the facet 260 makes with a plane perpendicular to the waveguides 310. The simulated insertion loss for the example optimal coupling is plotted in FIG. 6B. In addition, the simulated tolerance curve due to misalignment is plotted in FIG. 6C which shows good alignment tolerance for the integrated photonics system 10 with excess insertion loss of 0.25 to 1.5 dB depending upon the gap between the two facets.

Although the SiN waveguide 210 angle or tilt ($\theta_{W1}$) has been described as being 4°, it generally can be any small angle roughly between 1°-7° and in some embodiments, it is 0°. Reducing the SiN waveguide 210 angle or tilt ($\theta_{W1}$) generally results in a higher SiP chip 20 facet angle ($\theta_{F1}$) and hence constitutes a trade off with potential insertion loss due to increased reflection from the SiP chip 20 facet. Although the SiN waveguides 210 and the SOA waveguides 310 have been illustrated as having particular angles with respect to the perpendiculars of the general surface of the chips' sides 230 330 at the gap 420, it should be understood that the principles of the foregoing, in regards to back-reflection and phase tilt, are not dependent upon the general shape of the chips' external sides, but is dependent upon the relative angles and relative positioning of the lithographically defined angled facets and the tapered waveguides themselves. Accordingly, optoelectronic flip chips of any shape, in a bonding arrangement within appropriately shaped trenches in their host photonics chip and coupled as described above, are contemplated. Although the optimal example SOA 30 facet angles ($\theta_{F2}$) have been described as being 7°, in some embodiments it generally can be any angle roughly between 4°-10°. Although the optimal example SiP chip 20 facet angles ($\theta_{F1}$) have been described as being 20°, in some embodiments it generally can be any angle roughly between 15°-25°.

Figure 7A:
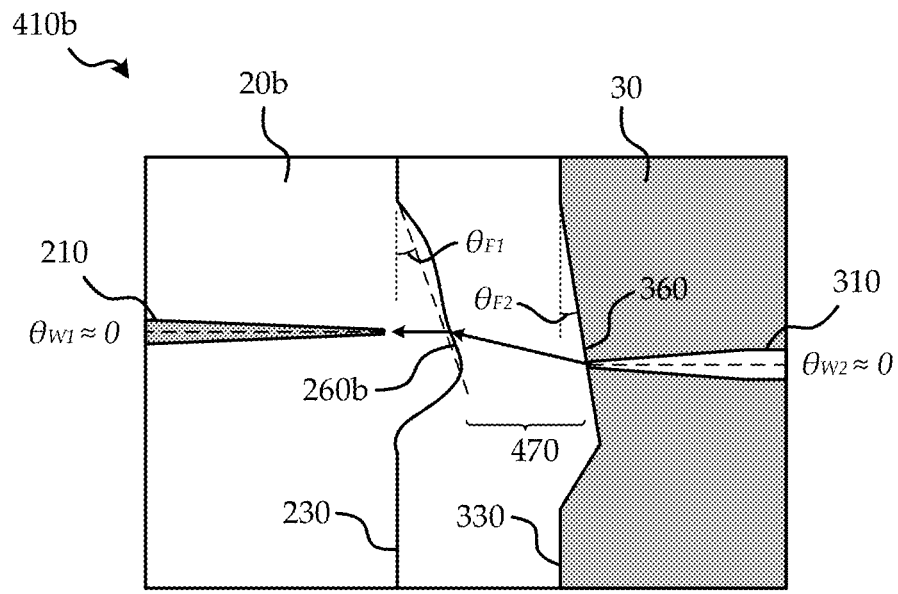
FIG. 7A is a schematic block diagram of an optical coupling of the optoelectronic flip-chip and host photonics chip including an angled freeform facet.

Although the SiP chip 20 and SOA 30 facets 260 360 have been generally described and illustrated as being generally planar, any suitable angled but also curved facet performing within acceptable tolerances may be used. As such, with use of numerical simulation and optimization facets on the SiP chip and the SOA may in general have any reasonably arbitrarily curved (nonlinear) surface, while still exhibiting the general facet orientations and angular relationships in accordance with the above teachings. Referring now to FIG. 7A, an optical coupling 410b of an improved SiP chip 20b which includes such an angled curved facet will now be discussed.

Figure 7B:
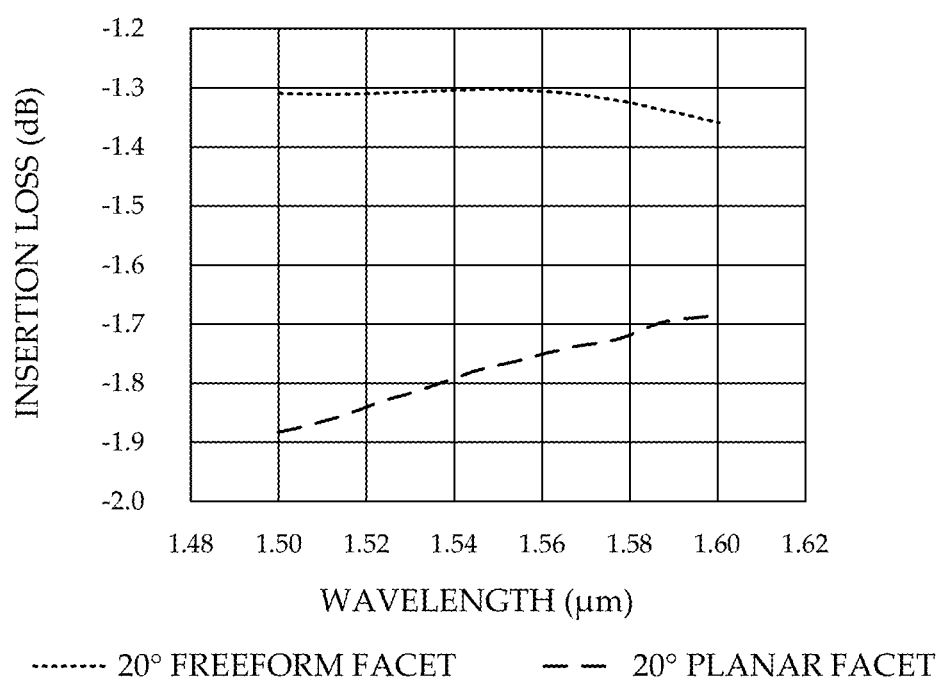
FIG. 7B illustrates graphs of insertion loss versus wavelength, comparing an optical coupling with an angled planar facet with the optical coupling of the embodiment of FIG. 7A.

Rather than a planar facet, the improved SiP chip 20b includes within each optical coupling 410b region, an angled curved facet 260b including a freeform surface substantially angled away from a plane parallel to side 230 of the SiP chip 20b at a facet angle of $\theta_{F1}$. The freeform surface of the angled curved facet 260b further improves the optical coupling 410b without additional manufacturing difficulty since the surfaces of the angled curved facets 260b are readily realizable being defined precisely by optical lithography. In order to improve the facet correction for the phase tilt of the wavefront emitted by a facet 360 of the SOA 30, the surface of the angled curved facet 260b is parametrized using a non-uniform spline or a Bezier curve in a simulation and then, given a particular SOA 30, the curve is optimized using numerical simulation as described above, to maximize the optical coupling between the SOA 30 and the SiP chip 20b. An angled curved facet 260b having a freeform surface which has been optimized in this way provides significantly better control of the optical wavefront than a fixed angle planar facet and hence demonstrates lower insertion loss. The freeform surfaces can also allow for the SiN waveguide 210 on the SiP chip 20b to be nominally 0° which is advantageous for coupling as well as alignment during the flip-chip bonding process. However, the freeform surfaces can be optimized for any SiN waveguide angle $\theta_{W1}$. Graphs presented in FIG. 7B demonstrate insertion loss of coupling between an SOA with facet angle of 7° with two kinds of SiP chip facets, one being a substantially 20° angled optimized freeform facet with SiN waveguide angle ($\theta_{W1}$) of 0°, and the other being a 20° planar facet with SiN waveguide angle ($\theta_{W1}$) of 4°. As can be clearly seen from the graphs, the insertion loss in couplings with the angled curved facet 260b (20° freeform curved facet) is markedly less than the insertion loss in couplings with the 20° planar facet.

Although embodiments of the improved integrated photonics system have been described above with specificity, it should be understood that the specific layers, waveguides, etc. materials and thicknesses thereof in the embodiments are exemplary only and various modifications and variations may be made without negating the improvements and advantages thereof nor departing from the above teachings. For example, the waveguide material of the SiP chip 20, rather than being formed in an SiN layer may be formed of Si such as in the Si layer 202 itself.

Figure 8A:
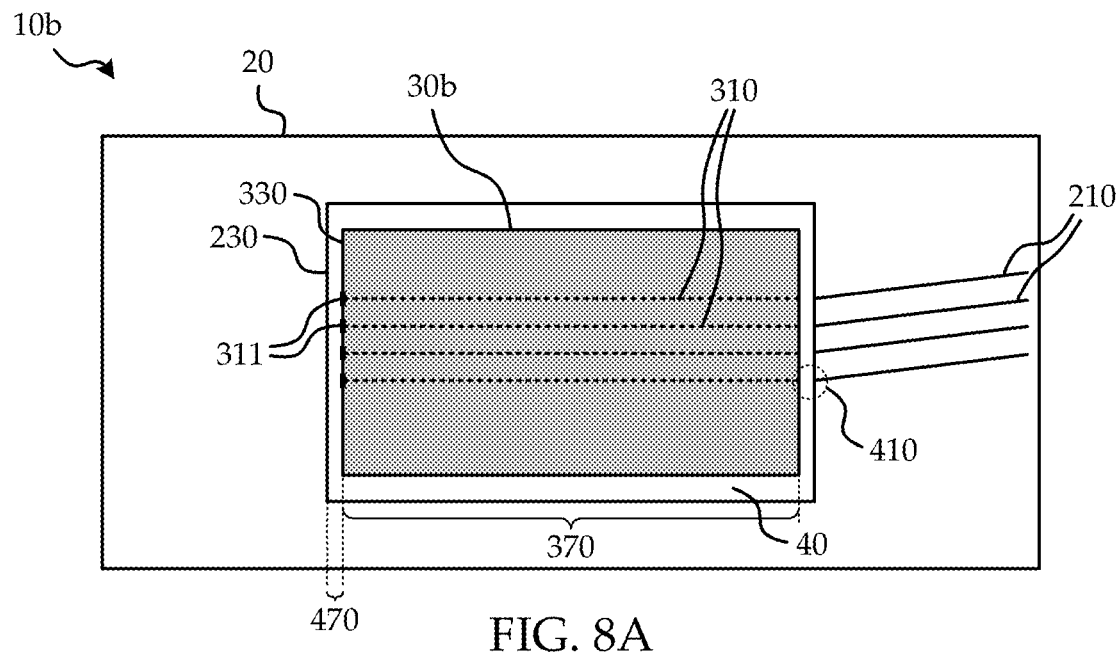
FIG. 8A is a schematic block diagram of a further embodiment of an integrated photonics system with a bonding arrangement of an optoelectronic flip-chip with a host photonics chip according.
Figure 8B:
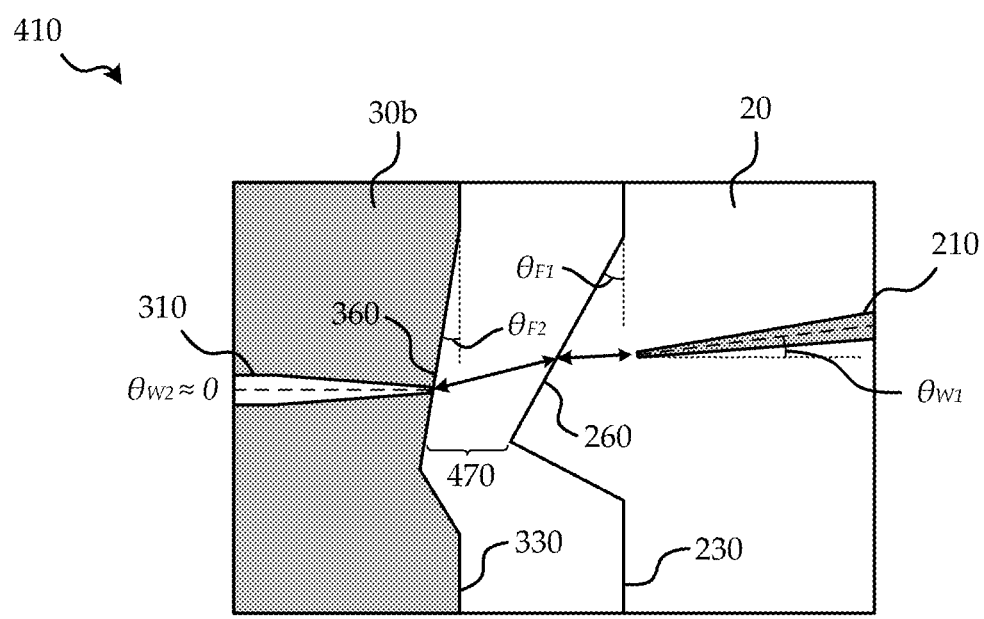
FIG. 8B is a schematic block diagram of an optical coupling of the optoelectronic flip-chip and host photonics chip of FIG. 8A.

In a further embodiment depicted in FIGS. 8A-8B, an improved integrated photonics system 10b includes a reflective semiconductor optical amplifier (RSOA) 30b. In such an embodiment, the RSOA 30b is similar to the SOA 30 of the other embodiments in almost all respects except rather than having two separate ingress and egress sides for optical signals, only one side of the RSOA 30b (shown on the right side in FIG. 8A) functions as both the optical ingress and optical egress for the chip, while the other side of the RSOA 30b (shown on the left side in FIG. 8A) is reflective. Optical couplings 410 on the one side of the RSOA 30b are structured and function similarly to those of the embodiments described above, however, as shown in FIG. 8B optical signals traverse the coupling in both directions. On the reflective side of the RSOA 30b, generally highly reflective coatings are utilized as mirrors 311 at least in the areas abutting the ends of the RSOA 30b waveguides 310. Since only one set of SiN waveguides 210 are utilized to couple with RSOA waveguides 310 on only one side of the RSOA 30b in this embodiment, lateral alignment of the RSOA 30b within the trench 40 need only take into account the single set of optical couplings 410 between those sets of waveguides, namely, the set on the right hand side of the RSOA 30b in FIG. 8A.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. An integrated photonics system comprising:
a photonics chip including a substrate, first one or more waveguides, and at least one pedestal formed in a trench of the photonics chip on the substrate; and
an optoelectronic flip-chip including second one or more waveguides, the optoelectronic flip-chip situated within the trench and flip-chip bonded to the photonics chip;
wherein the first one or more waveguides are arranged to optically couple, across gaps between the photonics chip and the optoelectronic flip-chip, to respective second one or more waveguides defining optical couplings, wherein within each optical coupling: an angled facet of the photonics chip is angled away from a first plane generally defining a side of the photonics chip adjacent the gap; and an angled facet of the optoelectronic flip-chip is angled away from the first plane and angled away from the angled facet of the photonics chip within the optical coupling.

2. The integrated photonics system of claim 1, wherein the angled facets of the photonics chip and the optoelectronic flip-chip comprise etched angled facets.

3. The integrated photonics system of claim 1, wherein the angled facets of the photonics chip and the optoelectronic flip-chip are angled such that phase tilt due to angular emission to and from the optoelectronic flip-chip is reduced.

4. The integrated photonics system of claim 3, wherein the angled facets of the photonics chip are angled at substantially 15°-25° with respect to the first plane, and wherein the angled facets of the optoelectronic flip-chip are angled at substantially 4°-10° with respect to the first plane.

5. The integrated photonics system of claim 4, wherein the angled facets of the optoelectronic flip-chip are angled away from a second plane perpendicular to the second one or more waveguides such that back-reflection within the optoelectronic flip-chip is reduced.

6. The integrated photonics system of claim 4, wherein the respective second one or more waveguides are substantially perpendicular to the first plane and wherein the first one or more waveguides comprise pairs of waveguides situated on opposite sides of the optoelectronic flip-chip and aligned with one another across the optoelectronic flip-chip.

7. The integrated photonics system of claim 4, wherein the respective second one or more waveguides are substantially perpendicular to the first plane and wherein the first one or more waveguides are angled at substantially 1°-7° with respect to the respective second one or more waveguides.

8. The integrated photonics system of claim 1, wherein the photonics chip comprises at least one pedestal within the trench on which the optoelectronic flip-chip rests, wherein the at least one pedestal comprises selectively etched pedestal Z-stops, wherein the optoelectronic flip-chip comprises selectively etched complementary Z-stops where the optoelectronic flip-chip rests on said at least one pedestal, and said pedestal Z-stops and said complementary Z-stops are etched such that said first one or more waveguides and said respective second one or more waveguides are aligned in a Z direction.

9. The integrated photonics system of claim 1, wherein the optoelectronic flip-chip and the photonics chip each have alignment marks for lateral alignment during a flip-chip bonding process.

10. The integrated photonics system of claim 1, wherein the first one or more waveguides are tapered to substantially 400 nm, wherein the second one or more waveguides are tapered to substantially 200 nm, wherein a width of the gap is substantially 500 nm, wherein the respective second one or more waveguides are substantially perpendicular to the first plane, wherein the first one or more waveguides are angled at substantially 4° with respect to the respective second one or more waveguides, wherein within each optical coupling an angled facet of the optoelectronic flip-chip is angled at substantially 7° with respect to the first plane, and wherein the angled facets of the photonics chip are angled at substantially 20° with respect to the first plane.

11. An integrated photonics system comprising:
a photonics chip including a substrate, first one or more waveguides, and at least one pedestal formed in a trench of the photonics chip on the substrate; and
an optoelectronic flip-chip including second one or more waveguides, the optoelectronic flip-chip situated within the trench and flip-chip bonded to the photonics chip;
wherein the first one or more waveguides are arranged to optically couple, across gaps between the photonics chip and the optoelectronic flip-chip, to respective second one or more waveguides defining optical couplings, wherein within each optical coupling an angled facet of the photonics chip is angled away from a first plane generally defining a side of the photonics chip adjacent the gap, and wherein the angled facets of the photonics chip comprise etched angled facets, each of which comprises a freeform curved surface.

12. The integrated photonics system of claim 11, wherein the angled facets of the photonics chip and the optoelectronic flip-chip comprise etched angled facets.

13. The integrated photonics system of claim 11, wherein the angled facets of the photonics chip and the optoelectronic flip-chip are angled such that phase tilt due to angular emission to and from the optoelectronic flip-chip is reduced.

14. The integrated photonics system of claim 13, wherein within each optical coupling an angled facet of the optoelectronic flip-chip is angled away from the first plane and angled away from the angled facet of the photonics chip within the optical coupling.

15. The integrated photonics system of claim 14, wherein the angled facets of the optoelectronic flip-chip are angled away from a second plane perpendicular to the second one or more waveguides such that back-reflection within the optoelectronic flip-chip is reduced.

16. The integrated photonics system of claim 14, wherein the respective second one or more waveguides are substantially perpendicular to the first plane and wherein the first one or more waveguides comprise pairs of waveguides situated on opposite sides of the optoelectronic flip-chip and aligned with one another across the optoelectronic flip-chip.

17. The integrated photonics system of claim 14, wherein the respective second one or more waveguides are substantially perpendicular to the first plane and wherein the first one or more waveguides are angled at substantially 1°-7° with respect to the respective second one or more waveguides, wherein within each optical coupling an angled facet of the optoelectronic flip-chip is angled at substantially 4°-10° with respect to the first plane, and wherein the angled facets of the photonics chip are angled at substantially 15°-25° with respect to the first plane.

18. The integrated photonics system of claim 11, wherein the photonics chip comprises at least one pedestal within the trench on which the optoelectronic flip-chip rests, wherein the at least one pedestal comprises selectively etched pedestal Z-stops, wherein the optoelectronic flip-chip comprises selectively etched complementary Z-stops where the optoelectronic flip-chip rests on said at least one pedestal, and said pedestal Z-stops and said complementary Z-stops are etched such that said first one or more waveguides and said respective second one or more waveguides are aligned in a Z direction.

19. The integrated photonics system of claim 11, wherein the optoelectronic flip-chip and the photonics chip each have alignment marks for lateral alignment during a flip-chip bonding process.

20. The integrated photonics system of claim 11, wherein the first one or more waveguides are tapered to substantially 400 nm, wherein the second one or more waveguides are tapered to substantially 200 nm, wherein a width of the gap is substantially 500 nm, wherein the respective second one or more waveguides are substantially perpendicular to the first plane, wherein the first one or more waveguides are angled at substantially 4° with respect to the respective second one or more waveguides, wherein within each optical coupling an angled facet of the optoelectronic flip-chip is angled at substantially 7° with respect to the first plane, and wherein the angled facets of the photonics chip are angled at substantially 20° with respect to the first plane.

* * * * *